No. 829,130. PATENTED AUG. 21, 1906.
A. J. VAN DEN HEUVEL & J. J. GALMAN.
VOTING MACHINE.
APPLICATION FILED DEC. 19, 1903.
10 SHEETS—SHEET 1.
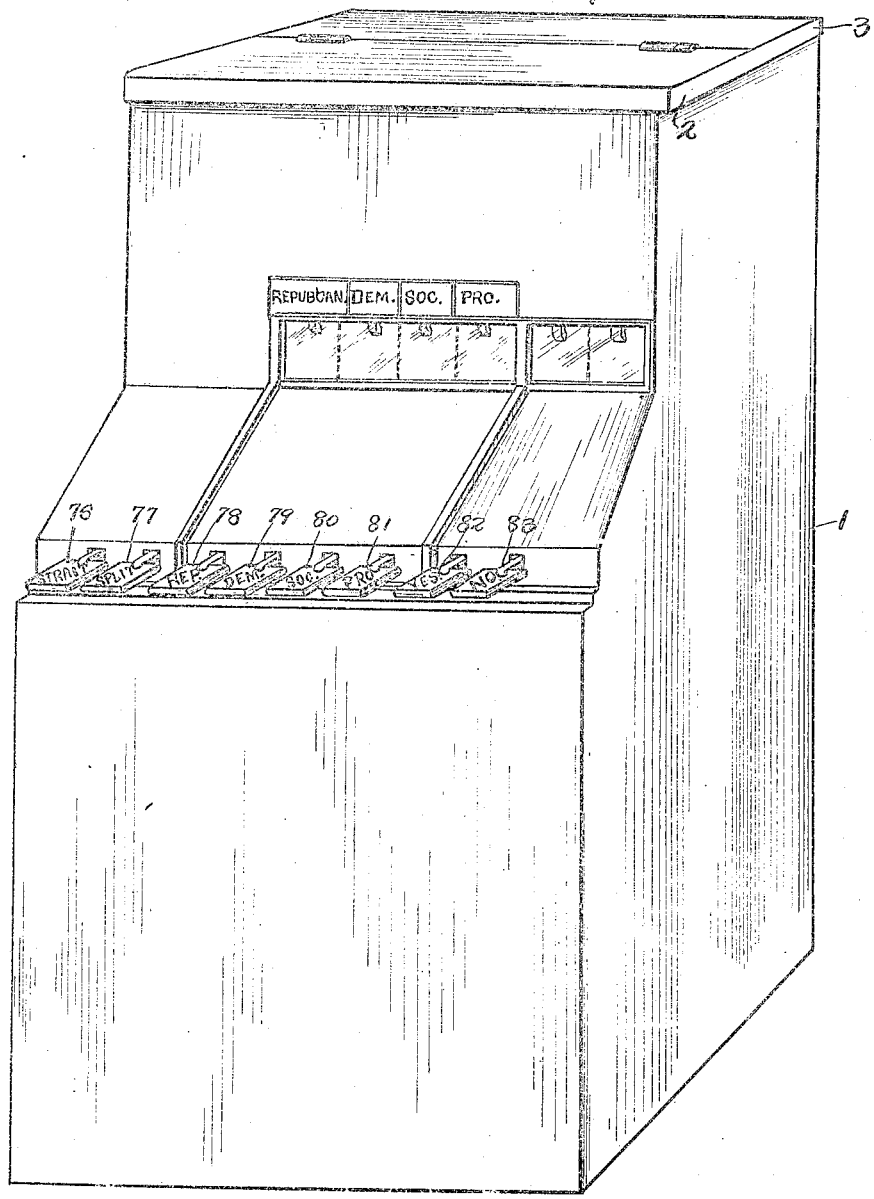

No. 829,130. PATENTED AUG. 21, 1906.
A. J. VAN DEN HEUVEL & J. J. GALMAN.
VOTING MACHINE.
APPLICATION FILED DEC. 19, 1903.
10 SHEETS—SHEET 2.
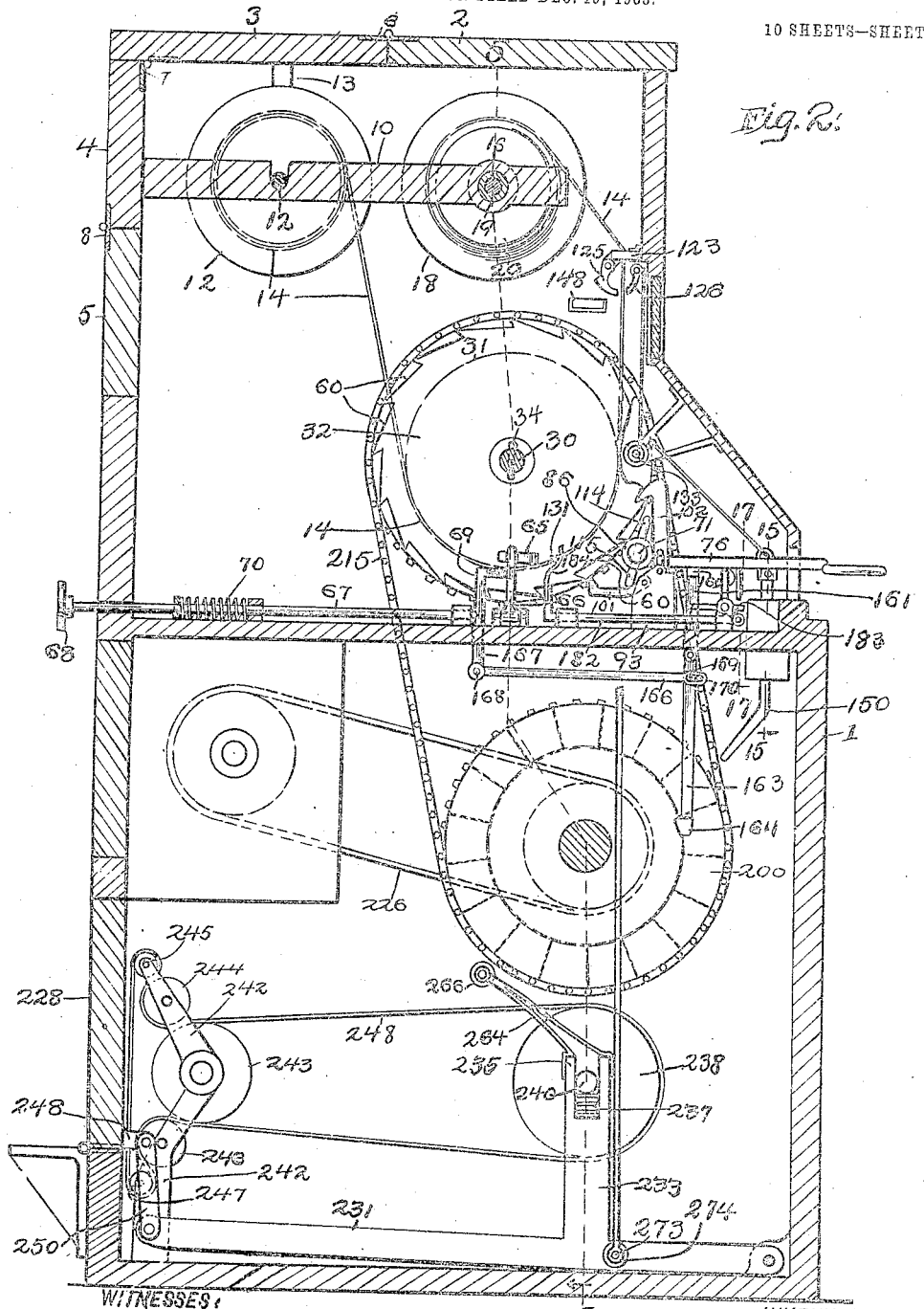

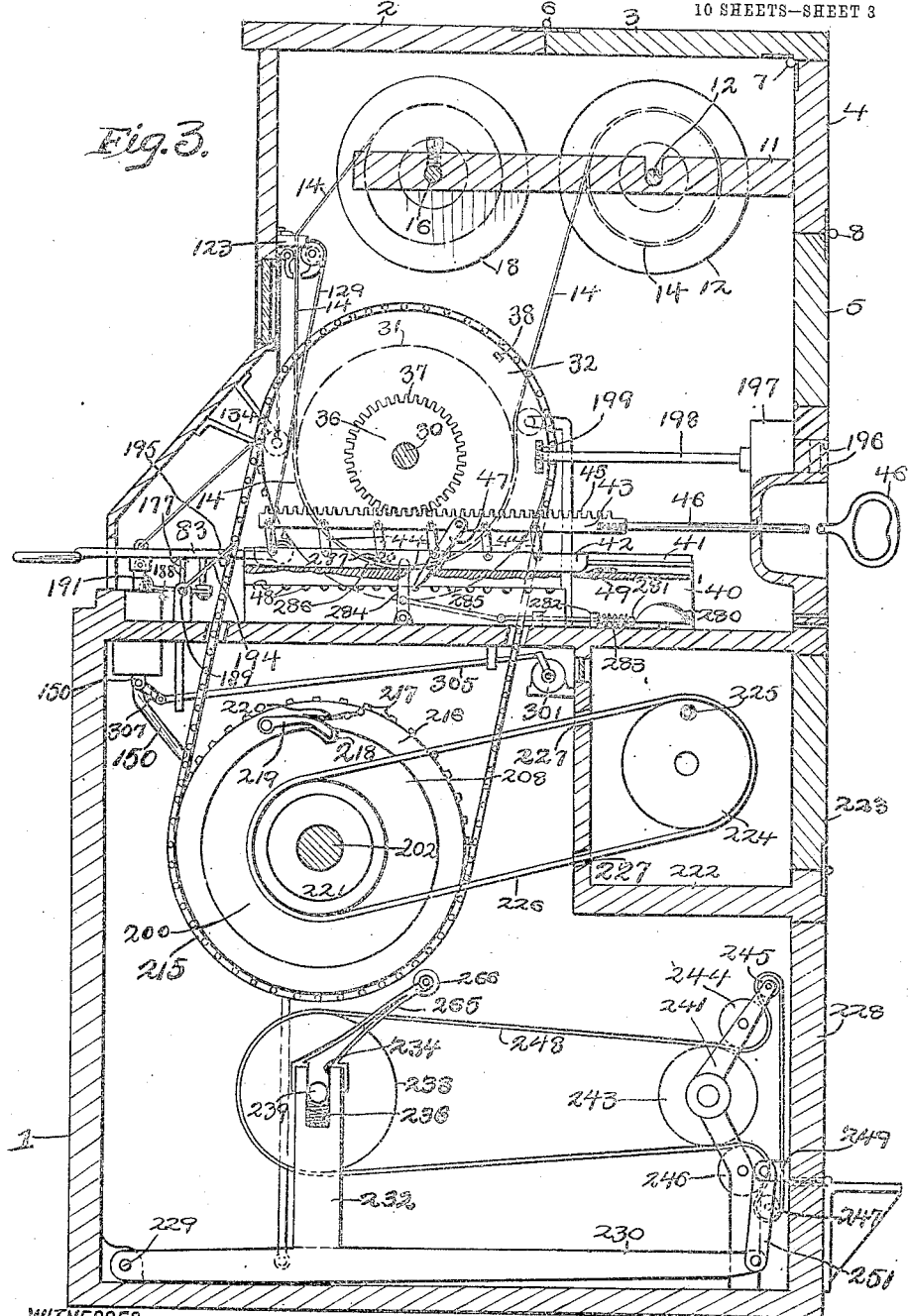

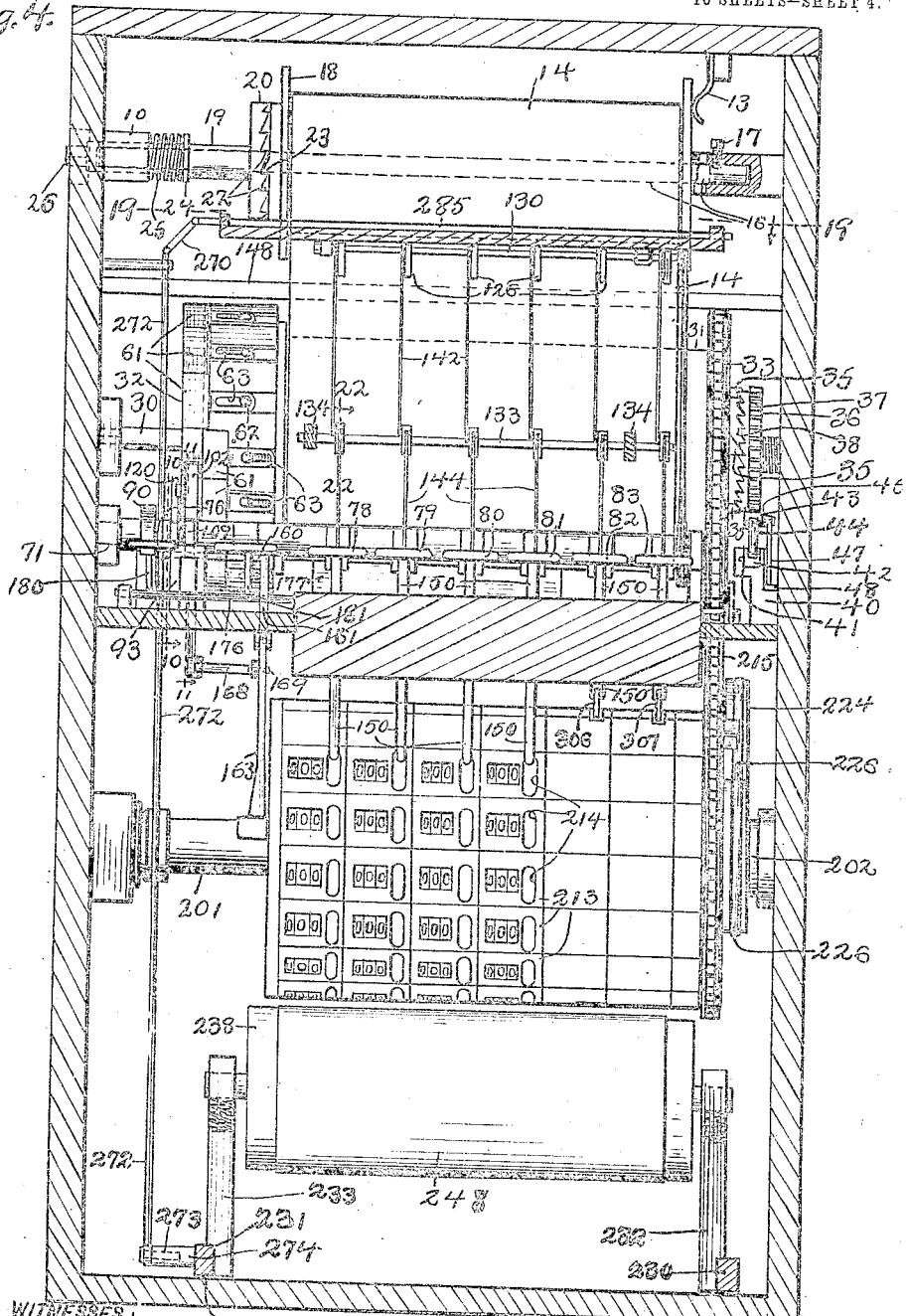

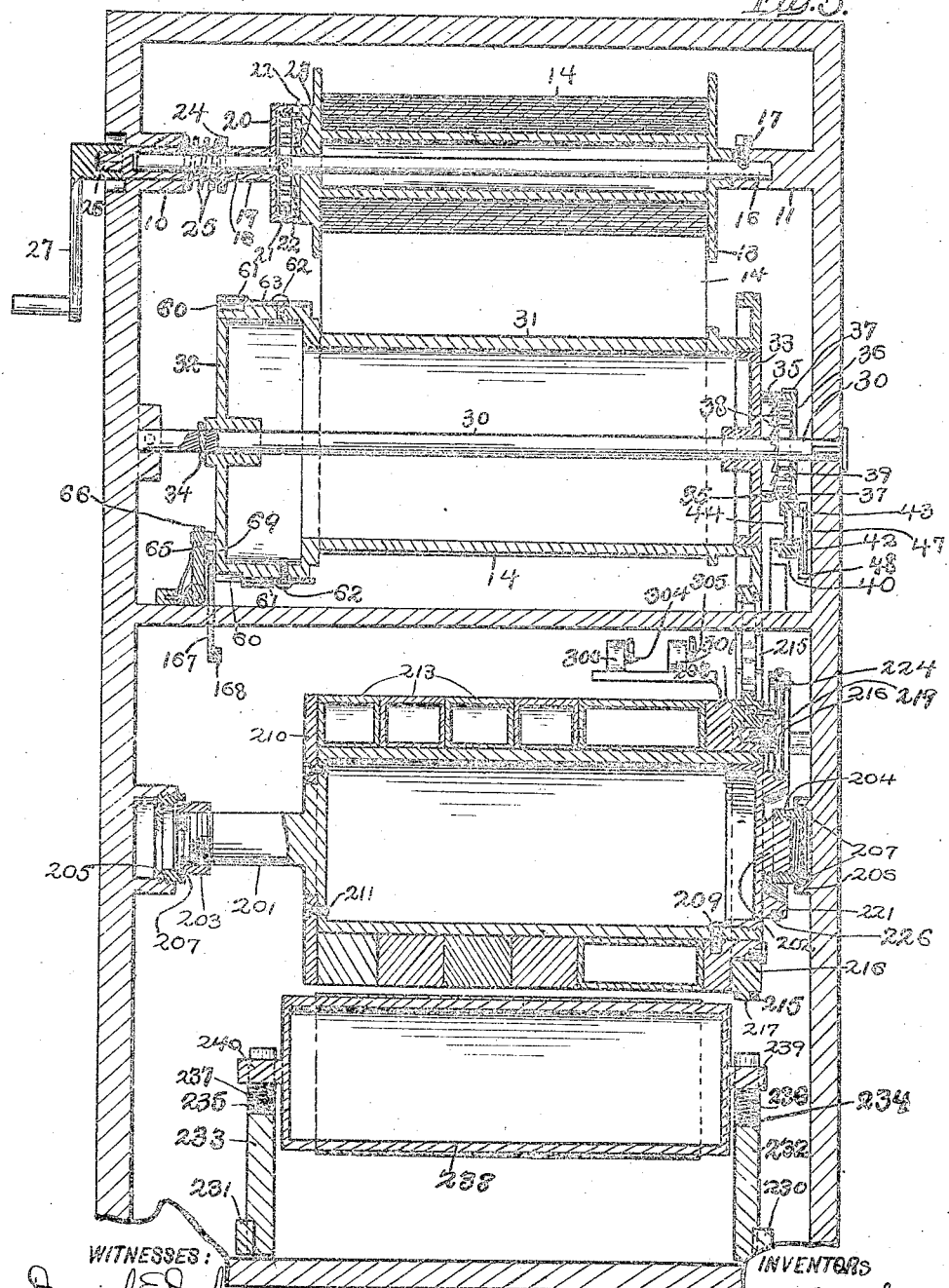

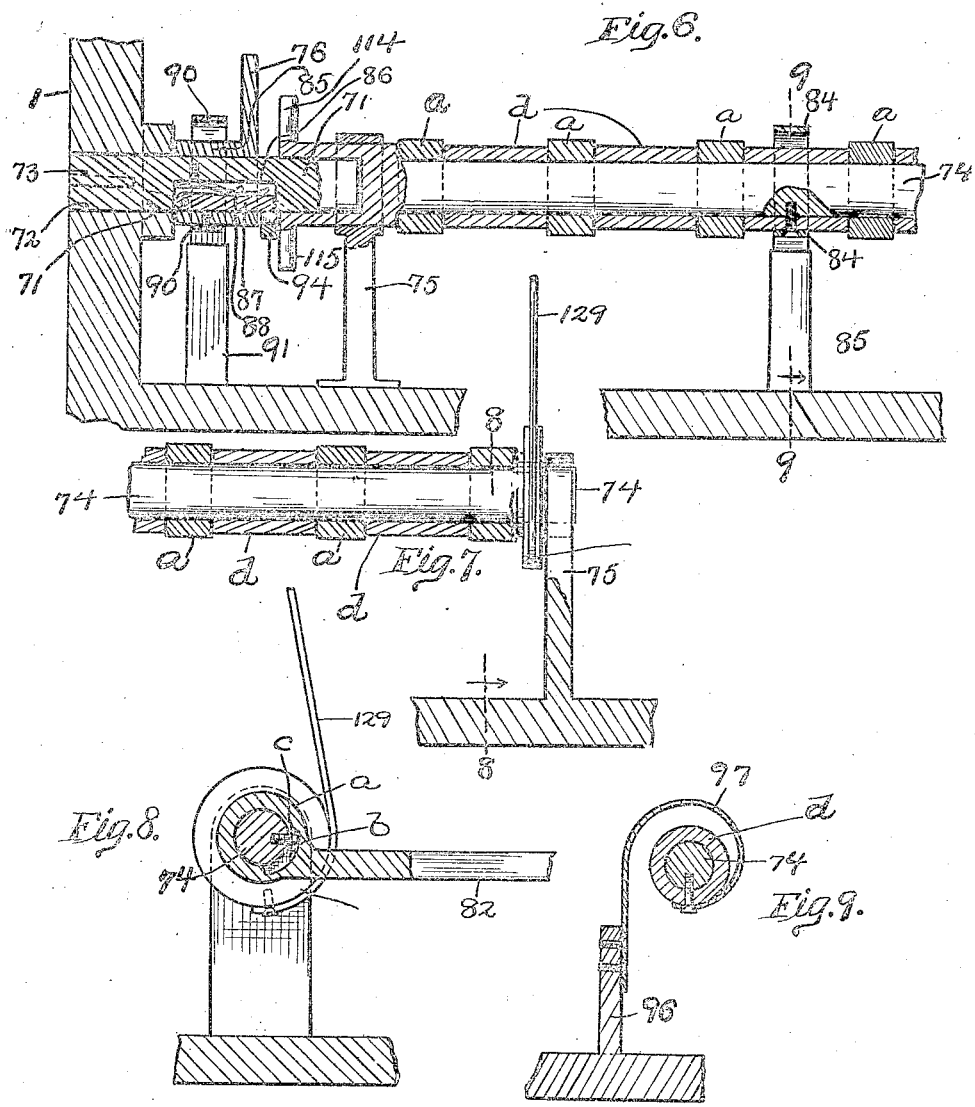

No. 829,130. PATENTED AUG. 21, 1906.
A. J. VAN DEN HEUVEL & J. J. GALMAN.
VOTING MACHINE.
APPLICATION FILED DEC. 19, 1903.
10 SHEETS—SHEET 7.
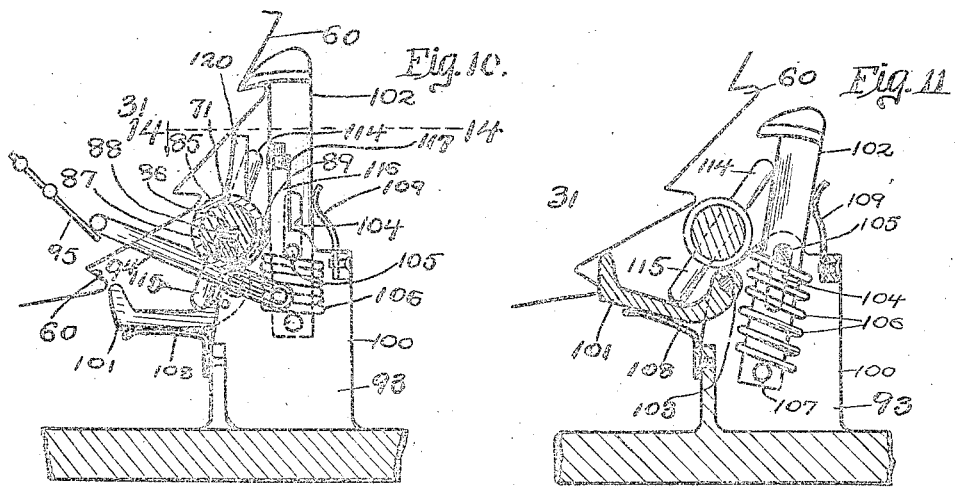
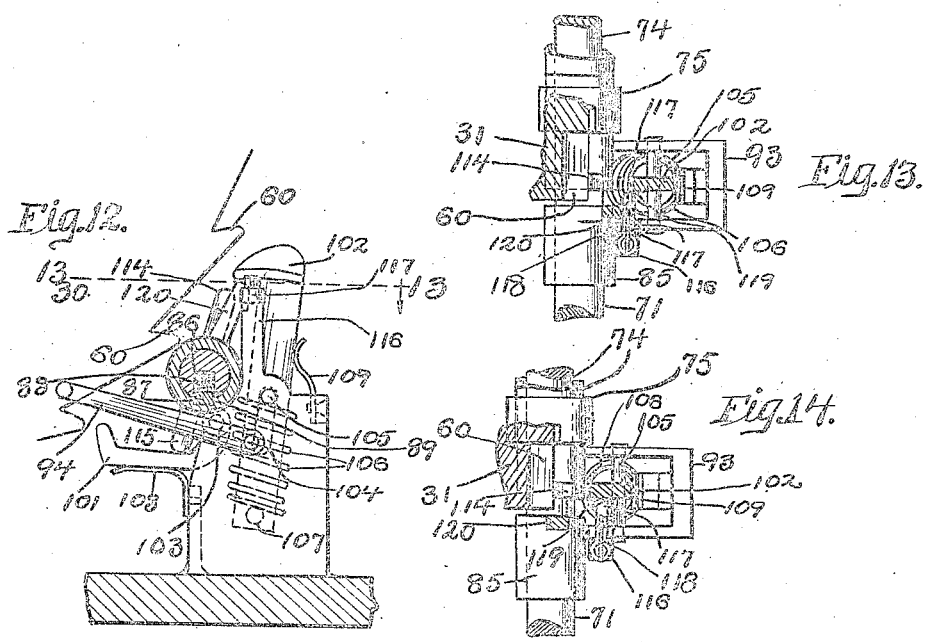

No. 829,130. PATENTED AUG. 21, 1906.
A. J. VAN DEN HEUVEL & J. J. GALMAN.
VOTING MACHINE.
APPLICATION FILED DEC. 19, 1903.
10 SHEETS—SHEET 8.
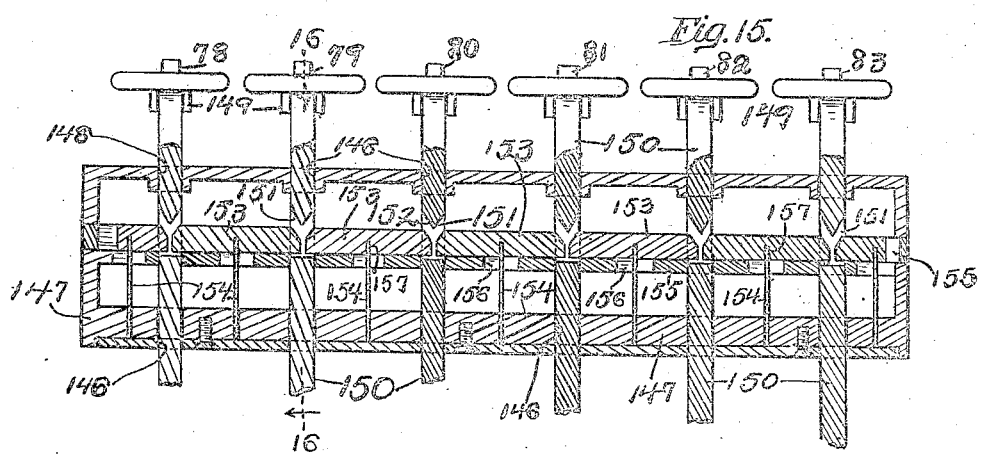
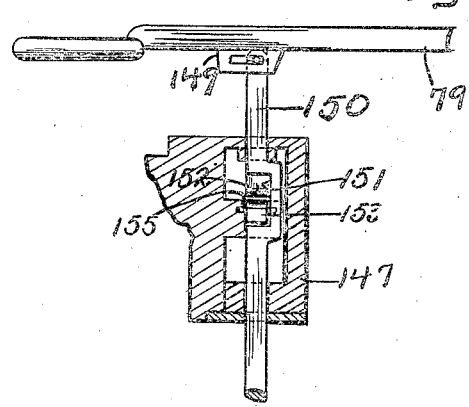
WITNESSES:
Daniel E. Daly.
Victor C. Lynch.
INVENTORS
Arie J. Vanden Heuvel
James J. Galman
by Lynch & Dorer
their ATTORNEYS.

No. 829,130. PATENTED AUG. 21, 1906.
A. J. VAN DEN HEUVEL & J. J. GALMAN.
VOTING MACHINE.
APPLICATION FILED DEC. 19, 1903.
10 SHEETS—SHEET 9.
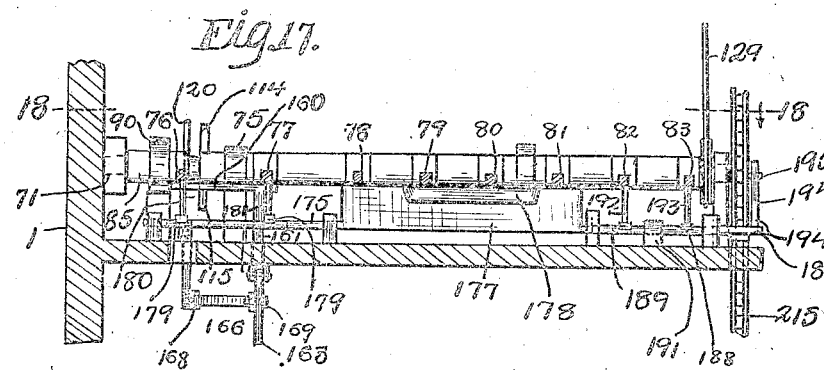
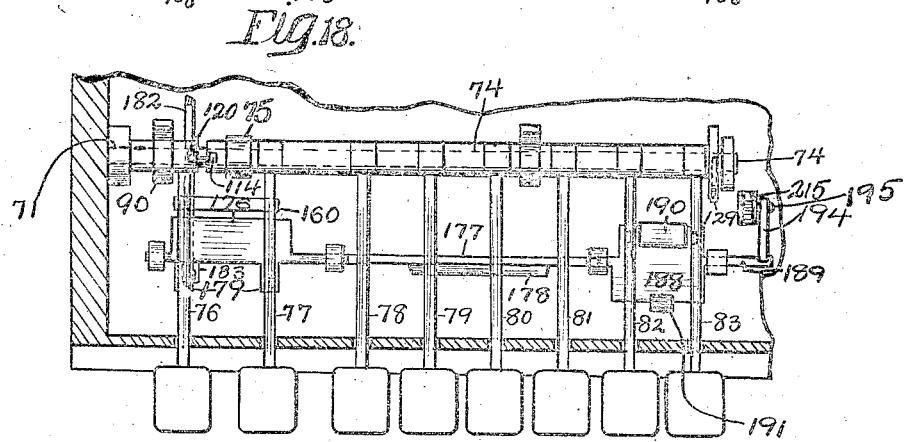

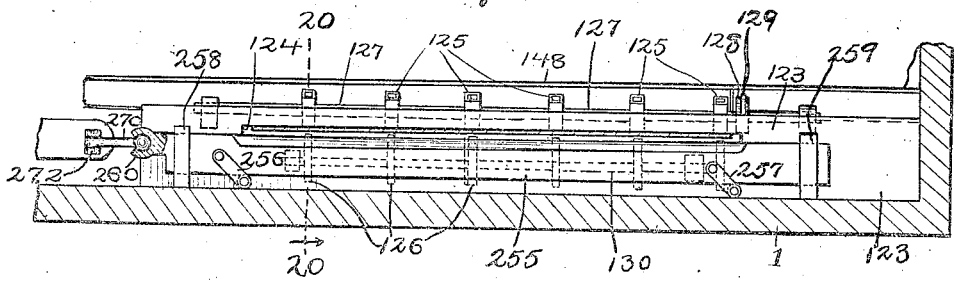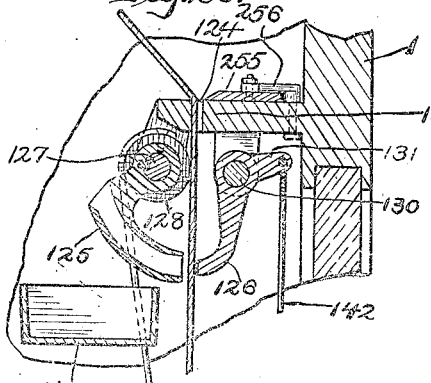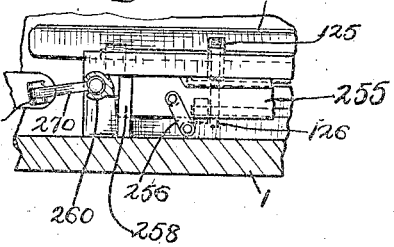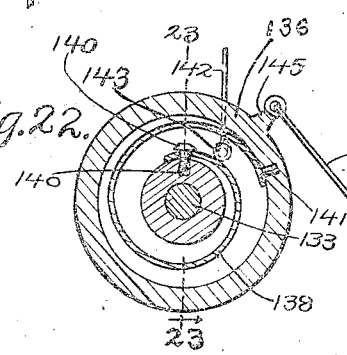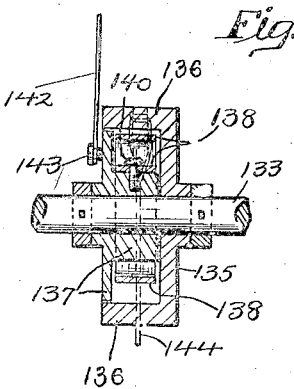

UNITED STATES PATENT OFFICE.

ARIE J. VAN DEN HEUVEL AND JAMES J. GALMAN, OF HOSPER, IOWA.

VOTING-MACHINE.

No. 829,130.    Specification of Letters Patent.    Patented Aug. 21, 1906.

Application filed December 19, 1903. Serial No. 185,903.

*To all whom it may concern:*

Be it known that we, ARIE J. VAN DEN HEUVEL and JAMES J. GALMAN, citizens of the United States of America, residing at Hosper, in the county of Sioux and State of Iowa, have invented certain new and useful Improvements in Voting-Machines; and we do hereby declare the following to be a full, clear, and exact description of the invention, such as will enable others skilled in the art to which it pertains to make and use the same.

This invention relates to improvements in voting-machines.

The object of our invention is to provide means for recording the votes for each candidate as cast, so that as soon as the polls are closed a complete record of the vote can be immediately obtained without waiting for the clerks to count the ballots.

This invention consists in providing new and improved means for displaying the ticket to the voter, new and improved means for registering the choice of the voter, new and improved means for marking the ballot, new and improved means for recording and indicating the number of votes cast, new and improved means for preventing fraudulent manipulation of the machine, and new and improved means for securing a final record of the votes cast.

This invention more particularly consists in providing a casing in which is mounted a spindle which carries a ticket comprising a continuous roll of paper or similar material on which are printed the names of the parties and candidates for the various offices. The names of the respective parties and the candidates belonging to each are arranged in parallel columns, as is now the case in the Australian system. The ticket is carried from the spindle, on which it is wound down to a driving-drum and then up again to a winding-spool. Means are provided for actuating the drum and the spool, so that when the mechanism is operated the driving-drum will revolve, drawing the ticket from the spindle, and causing it to feed onto the winding-spool. The ticket as it passes from the spindle to the driving-drum is carried across an opening or window in the case, which allows the names on the ticket to be seen by the person voting. In the case just inside the window, where they can be observed by the party voting, are arranged marking devices. These marking devices preferably consist of punches, and a separate punch is provided for each party and is arranged to cut in the ticket a characteristic emblem significant of the party voted for, such as an elephant, a rooster, a shamrock, &c.

Operatively connected with the driving-drum is arranged a second drum, on the surface of which are arranged a series of registers. One register is provided for each candidate on the ticket and the numbers on the faces of the registers are arranged as in printing-type, so that an impression of them can be taken on a strip of paper suitably arranged in the lower part of the casing. The voting mechanism is operated and controlled by a series of keys, two of which, at least, must always be depressed in order to cast or record a ballot. One key must always be depressed preparatory to voting a straight-ticket, and then the key of the particular party is depressed and the ballot is finished. Again, another key must be depressed preparatory to voting a cut-ticket, after which any keys desired can be depressed in succession. Keys are also provided for voting amendments, all of which will be minutely described in the following pages.

Referring to the drawings, Figure 1 is a perspective view of our machine. Figs. 2 and 3 are views of the opposite ends of the machine with the casing removed. Fig. 4 is a front view of the machine with the casing removed. Fig. 5 is a section on line 5 5, Fig. 2, looking in the direction of the arrow. Figs. 6 and 7 are detail views, mostly in section, showing the shaft which carries the operating-keys. Fig. 8 is a section on line 8 8, Fig. 7, looking in the direction indicated by the arrow. Fig. 9 is a section on line 9 9, Fig. 6, looking in the direction of the arrow. Fig. 10 is a section on line 10 10, Fig. 4, looking in the direction of the arrow, showing position of parts when the machine is at rest. Fig. 11 is a section on line 11 11, Fig. 4, showing position of parts when a party-key is depressed. Fig. 12 is a similar view to Fig. 10, when the straight-ticket key has been depressed. Fig. 13 is a section on line 13 13, Fig. 12. Fig. 14 is a section on line 14 14, Fig. 10. Fig. 15 is a section on line 15 15, Fig. 2. Fig. 16 is a section on line 16 16, Fig. 15. Fig. 17 is a section on line 17 17, Fig. 2. Fig. 18 is a section on line 18 18, Fig. 17. Fig. 19 is a section on line 19 19, Fig. 4. Fig. 20 is a section on line 20 20, Fig. 19. Fig. 21 is a view similar to Fig. 19, showing mechanism in a different position. Fig. 22 is a section on line 22

22, Fig. 4. Fig. 23 is a section on line 23 23, Fig. 22.

In the accompanying drawings, 1 represents the case of our machine. The upper portion of the casing is preferably formed of independent sections 2, 3, 4, and 5, secured together by hinges 6, 7, and 8, which allow the top and upper portion of one side of the case to be folded down to give access to the interior thereof. At each side of the casing, near the top, are arranged brackets 10 and 11. A spindle 12 extends across from side to side of the casing and is arranged in suitable bearings in said brackets 10 and 11, so that it can be readily placed therein or removed therefrom. A spring 13 is arranged on one side of the case, so as to come into contact with the spindle 12 and act as a brake for retarding the movement thereof. The spindle 12 carries the ticket-roll 14 before it has been voted. In the brackets 10 and 11, in front of the spindle 12, is mounted a shaft 16, which is held against rotation by means of a screw 17. On the shaft 16 is loosely mounted a spool 18. Around one end of the shaft 16 is arranged a sleeve 19, on the end of which, adjacent to the spool 18, is formed a hollow head or box 20. In this box is arranged a coil-spring 21, one end of which is secured to the box 20, and the other end is secured to the shaft 16. The rim of the box 20 is corrugated or serrated to form teeth 22. On the head of the spool 18, adjacent to the box 20, are formed lugs 23, arranged to engage with the teeth 22. A collar 24 is secured on the sleeve 19, and on the said sleeve 19 between this collar and the bracket 10, is arranged a coiled spring 25, which normally holds the box 20 against the head of the spool 18. The end of the sleeve 19 is arranged to project through the side of the casing and is provided with a squared end at 26, adapted to be engaged by a key 27. Below the shaft 16 is mounted a shaft 30, which is keyed in the side of the case 1. On this shaft 30 is loosely mounted a cylinder or drum 31, which is provided with ends or heads 32 and 33, respectively. The drum 31 is held against longitudinal movement on the shaft 30 by a pin 34. On the head 33 are formed a series of lugs 35. On the shaft 30, adjacent to the head 33, is loosely mounted a wheel 36, which is provided with teeth 37 on its perimeter and teeth 38 on its body near its perimeter. A coil-spring 39 is arranged around the shaft, and one end thereof is secured to the said shaft 30 and the other end to the said wheel 36. The teeth 38 on the said wheel 36 are arranged to engage with the lugs 35 on the head 33. Below the wheel 36 is arranged a plate 40, in which is formed a guideway 41. In the guideway 41 is arranged a bar 42, to which is secured a bar 43 by means of links 44. On the bar 43 is formed a rack 45, arranged to engage with the teeth 37 on the wheel 36. The bar 43 is provided with a handle 46, which extends out through the casing at the back thereof. The links 44, which connect the respective bars 42 and 43, are formed longer than the distance or space between the said two bars when the rack on the bar 43 is in engagement with the teeth on the gear-wheel 36. A pawl 47 is secured to the bar 43 and is arranged to travel over a corrugated surface 48, formed on the plate 40. In the guideway 41 is arranged a spring-clip 49 in contact with the bar 42 and holds the bar 42 stationary until the bar 43 has been raised and the rack 45 brought into engagement with the gear-wheel 36.

The purpose and operation so far described is as follows: The ticket 14 is carried down from the spindle 12 around the drum 31 and then up to the spool 18. The spring 21, which actuates the spool 18, is then put under tension by revolving the sleeve 19 by means of a key 27, and the spring which actuates the drum 31 is wound by pulling out the handle 46. When the mechanism which controls the operation of the drum 31 is actuated, the said drum 31 will be rotated by the spring 39 and the ticket will be drawn from the spool or bobbin and fed onto the spool 18 and all slack will be kept out of the ticket by the spring 21, which causes the spool 18 to wind in the ticket as it is fed from the drum. The object of the pawl 47, which travels over the corrugated surface 48, formed on the plate 40, is to compel the operator to pull out the handle 46 its full length and to shove it back completely each time he operates it, for in order that the handle can be shoved back it is necessary to pull it out until the pawl 47 clears the corrugated surface 48 and hangs down on the front end thereof. The handle can be then shoved back, and likewise, before the handle can be pulled out again, it must be shoved in far enough to allow the pawl to hang down at the opposite end of the plate.

Around the periphery of the drum 31 at the end near the head 32 are formed a series of teeth 60, which are spaced the same distance apart as the names on the ticket. Around the periphery of the drum, near the teeth 60, are mounted a series of plates 61, each of which is wide enough to span the space between any two of the teeth 60. These plates 61 are secured to the drum 31 by pins 62, which pass through slots 63, formed in the plates, so that the plates can be moved forward to cover the spaces between the teeth or can be shoved back, leaving the teeth unobstructed. The object of this arrangement is as follows: As many teeth are required on the drum as there are names on any one ticket which is to be voted, and as the number of names on a ticket will vary at different elections, therefore when the machine is first made as many teeth will be formed on the drum as will likely be required at any election. Then when the number of names on a ticket at an election are less than the number of teeth on a drum the plates 61 are moved over to cover up enough spaces between the teeth as will reduce the number of teeth to the number of candidates or names on the ticket.

On the head 32 of the drum 31 is formed a lug 65. Near the side of the casing 1 is secured a spring-controlled pawl 66, arranged to engage with the lug on the head 32 of the drum 31 and prevent the rotation of the said drum 31. A rod 67 is mounted in the casing 1, and the end thereof extends out at the back of the casing and is preferably provided with a knob 68. On the rod 67 is arranged an arm 69, which can be brought into contact with the pawl 66, so as to lift it away from the lug 65 on the drum-head 32. A coil-spring 70 is preferably provided for holding the rod 67 in its normal position. The lug 65 and the pawl 66 form a lock which prevents any movement of the drum 31 until the officer in charge of the machine pushes in on the knob 68 and lifts the pawl away from the lug.

A small shaft 71 is keyed in a socket 72, formed in the side of the case 1 and is rigidly secured therein by a feather 73. A second shaft 74 is journaled in standards 75 in line with the shaft 71. On these two shafts are mounted the operating-keys. A key 76 is journaled on the stationary shaft 72, and this key controls the mechanism the operation of which allows a straight-ticket to be voted. The other keys are all mounted on the shaft 74, and the key 77 controls the mechanism the operation of which allows a split ticket to be voted. The keys 76 and 77 for convenience may be termed the "master-keys." The keys 78, 79, 80, and 81 are the party-keys, and the keys 82 and 83 are the keys by means of which amendments can be voted.

The keys are mounted and arranged as follows: On the inner end of the key 76 is formed an enlargement or annular head 85, arranged to slip on the shaft 71. In the shaft 71 is formed a recess 86, in which is hinged a tongue 87. In the recess 86, behind the tongue 87, is mounted a spring 88, arranged to exert a constant pressure against the tongue 87, so as to force it out of the said recess. In the annular head 85 is formed a slot 89, approximately equal in width to the recess in the shaft 71, so that when the said slot 89 and the said recess 86 register with each other the tongue 87 will be forced into the said slot 89, and thereby lock the key 76 to the shaft. The reason for mounting the key 76 in this manner is so that every time the key is depressed it will be locked in its lowest position. A coil-spring 90 is secured at one end to a stationary support 91 and at its other end to the head 85. The object of this spring 90 is to lift the key 76 to its normal position after it has been depressed. Near the drum 31 is mounted a standard 93. On this standard is fulcrumed a lever 94, arranged so that when it is raised it will come into contact with the tongue 87 when said tongue is in the slot 89 in the head 85 and force it back into the recess 86, thus freeing the said head. On the drum 31 is secured a flexible finger 95, which is arranged to come into contact at each complete revolution of the drum 31 with the lever 94 and raise it sufficiently to press the catch 87 back into the socket 86, thereby unlocking the key 76 from the shaft 71. The keys 77, 78, 79, 80, 81, 82, and 83 are all mounted in the same way on the shaft 74, each of the said keys being provided with an annular head $a$, arranged to fit loosely on the shaft 74, so as to turn freely thereon. In each of the annular heads $a$ is formed a recess $b$. In the shaft 74 are secured a series of pins $c$, one of which is arranged to project into each of the respective recesses $b$ in the respective annular heads $a$. The object of mounting the last-mentioned keys in this manner is so that when any one of the keys is depressed it will cause a rotation of the shaft 74 without moving the other keys or being affected by their presence on the same shaft. Thus when one of the keys 77, 78, 79, 80, 81, 82, or 83 is depressed it will cause a rotation of the shaft 74 as the pin which extends into the recess in the said key locks the said key to the shaft, but at the same time the rotation of the shaft will not cause any movement of the other keys, for as the shaft rotates the respective pins will travel in the respective recesses. Therefore, although it will be impossible to depress any one of the keys without causing a rotation of the shaft 74, the rotation of the shaft will in no way affect the other keys. The keys on the shaft 74 are preferably spaced by means of collars $d$. One end of a coil-spring 97 is secured to a stationary support 96, and the other end is secured to the shaft 74 for the purpose of returning the shaft to its normal position after it has been rotated by depressing a key.

On the standard 93 are mounted pawls 101 and 102, respectively arranged to engage said teeth 60 of the drum 31. The pawl 101 is pivotally secured in the usual manner to the standard 93 by a pin 103. In the pawl 102 is formed a slot 104, arranged to receive a pin 105, which projects from the side of the standard 93, by means of which the said pawl is secured to the standard, so that it is capable of both an oscillatory and vertical movement. A coil-spring 106 is arranged on the pawl 102 between the pin 105 and a pin or stop 107, secured at the lower end of the pawl 102. The object of this coil-spring 106 is to return said pawl to its lower position after it has been raised vertically and also to act as a cushioning device for the drum 31, as will hereinafter appear. Springs 108 and 109 are provided for holding the respective pawls 101 and 102 in engagement with the teeth of the drum 31. The said pawls 101 and 102 are operated by pressing the keys, and the arrangement is as follows: On the shaft 74 are formed two lugs 114 and 115. When the shaft 74 is rotated by depressing any of the keys mounted thereon, the lug 114 will come into contact with the pawl 102 and disengage it from the teeth 60 of the drum 31, and the lug 115 will move away from the pawl 101 and allow the pawl to engage with the said teeth 60, and, again, when the shaft is rotated back to its original position the lug 114 will move away from the pawl 102 and allow it to engage with the teeth 60, and the lug 115 will come into contact with the pawl 101 and disengage it from the teeth 60. On the standard 93 is formed a vertical arm 116, on the upper end of which is mounted a pawl 117, arranged to swing horizontally. A spring 118 is secured to the pawl 117 and to the arm 116, so as to hold the pawl 117 normally at a right angle to the path of the pawl 102. On the pawl 102 is formed a small lug or projection 119, arranged to come into contact with the pawl 117. On the head 85 of the key 76 is secured an arm 120, arranged so that when the said key 76 is depressed the said arm will come up against the pawl 117 and prevent it from swinging toward the drum 31.

The operation of this portion of the mechanism is as follows: When the machine is at rest, before any of the keys are pressed, the pawl 101 is held out of engagement with the teeth 60 of the drum 31 by the lug 115, and the pawl 102 is in engagement with the teeth 60 of the drum 31, thereby preventing the drum from rotating. Now if the voter wishes to cast a straight-ballot, he begins by pressing down the master-key 76, and as the said key 76 moves down, the arm 120 on the head thereof, will move out, and when the said key 76 is at its lowest point said arm 120 will be against the pawl 117 (as shown in Figs. 12 and 13) and at the same time the slot 89 in the key 76 will register with the slot 86 in the shaft 71 and the tongue 87 will enter the slot 89, locking the key 76 in its lowest position. Next, the party-key corresponding to the ballot which it is desired to vote is pressed down, and as the key moves down it rotates the shaft 74, which carries the lug 115 away from the pawl 101, allowing the said pawl to move in and engage with the teeth 60 of the drum 31, and at the same time the lug 114 will come into contact with the pawl 102 and shove it out of engagement with the teeth 60. Now as soon as the pawl 102 is disengaged from the drum 31 it is pulled down by the spring 106, and as the lug 114 continues to move out it will carry the pawl 102 past the pawl 117, and the pawl 117 will swing in behind the lug 119, formed on said pawl 102, thereby locking said pawl 102 in its outer position, for the pawl 117 is prevented by the arm 120 from swinging in toward the drum 31, so as to allow the pawl 102 to pass back again. It will be observed that when the keys are pressed down there is no movement of the drum 31, and consequently no movement of the ticket, and this is necessary, because when the keys are pressed down the ticket is marked or punched, as hereinafter described, and if the ticket moves while being marked or punched it might be torn. As soon as the voter lifts his finger from the party-key, the shaft 74 will be rotated back to its original position by the spring 97, and the lug 115 will be moved away from the pawl 102; but the pawl 102 will not engage with the teeth 60 of the drum 31, as the said pawl 102 is held out by the said pawl 117, and the lug 115 will again come in contact with the pawl 101 and shove it out of engagement with the drum 31, and the drum 31 then being free to move will be rotated by the action of its own spring 39, and when it has about completed a full revolution the flexible finger 95 will come in contact with the lever 94 and raise it, thereby unlocking the key 76 from the shaft 71, and the said key 76 is raised by the spring 90, and the arm 120 on said key will move away from the pawl 117 and the pawl 102 will be forced past the pawl 117 by the action of its own spring 109 and will again engage with the same tooth of the drum 31, with which it was in engagement before the party-key was depressed by the voter. The drum 31 will continue to move until it has lifted the pawl 102 against the action of the spring 106, for the spring 39, which drives the drum 31, is stronger than the spring 106, and this arrangement serves to cushion the stopping of the drum 31, preventing any jarring, and thereby lessening the wear on the various parts of the machine. If the voter wishes to vote a split ticket, he first presses down the master-key 77, thereby rotating the shaft 74 and the lug 115 will move away from the pawl 101 and allow it to engage the teeth on the drum 31, and the lug 114 will move out, shoving the pawl 102 out of engagement with the teeth of the drum 31. As soon as the finger of the voter is lifted from the key 77, the shaft 74 moves back to its original position, under the action of the spring 97, and the lug 114 will move away from the pawl 102, allowing said pawl 102 to come in again and engage with the teeth of the drum 31; but, as already explained, as soon as the pawl 102 is disengaged from the teeth of the drum it is pulled down by the spring 106 so that when it again approaches the drum it can not engage with the same tooth, although the drum has not moved, but will be in position to engage with the next tooth on the drum 31. Also the lug 115 will again come into contact with the pawl 101, disengaging it from the teeth of the drum, and the drum will then be free to rotate until it comes into contact with the pawl 102 and lifts it to its highest position against the spring 106, and the drum will then have moved the distance between two of the teeth 60, which will be sufficient to move the headings of the tickets up and bring the names of the first candidates on the tickets in position to be marked or punched. The voter next presses down the party-key of the party to which the candidate belongs for whom he wishes to vote, and the operation of the escapement is just the same as when the master-key 77 was depressed, and the drum will be rotated sufficiently to bring the next candidates on the tickets in position to be marked, and the voter will then press down the party-key of the party to which the candidate belongs for whom he wishes to vote next, and so on through the whole ballot. A party-key must be pressed down for each office on the ticket.

The devices for marking or punching the ticket are arranged as follows: On the inside of the casing 1 along the front side thereof is secured a cross-piece 123, in which is formed a slot 124, through which the ticket passes. On the cross-piece 123 are mounted as many marking devices or punches as there are parties' keys and amendment-keys—that is to say, all the keys are connected with punches except the two master-keys. Each punch comprises two members 125 and 126, respectively, which are preferably so formed that they will cut in the ticket an emblem or symbol indicative of the party to which the candidate belongs. The member 125 is keyed on a shaft 127, which is journaled in the cross-piece 123. A collar or drum 128 is also keyed on the shaft 127, and to this drum is secured a cord 129, which is then carried down to and secured to a drum 132 on the shaft 74, which carries the party and amendment-keys. The member 126 is pivotally secured to the cross-piece 123 by means of a pin 130. To the member 126 is secured an arm 131. A small shaft 133 is supported from the front of the casing by hangers 134. On this shaft are arranged as many safety devices as there are punches. The object of the safety devices is to allow the key which operates the punches to move down after the punch members have come together without danger of breaking the connection between the punch and the said key. Each of the safety devices comprises a circular plate 135, which is arranged to revolve freely on the said shaft 133. On the plate 135 is formed an annular flange 136. On the shaft 133 is mounted a small wheel 137, the hub of which extends within the flange 136 and is operatively secured thereto by means of a coil-spring 138, one end of which is secured to the hub of the said wheel 137 by a screw 140, and the other end is secured to the flange 136 by a screw 141. One end of a cord 142 is secured to the arm 131 of the punch member 126, and the other end is secured to a stud 143 on the wheel 137. One end of a cord 144 is secured to a stud 145 on the wheel 135, and the other end is secured to a key directly below said punch member. The spring 138 is made sufficiently strong to bind the plate 135 to the wheel 137, so that the two will move as one piece under normal conditions; but when a force is exerted on a key which might snap the cords 142 and 144 then the spring will yield and allow the plate to revolve independently of the wheel.

The operation of the punching devices is as follows: When one of the party-keys or amendment-keys are depressed, the two punch members will be brought together and will punch a hole in the ticket immediately opposite the window in the front of the casing and in the ballot corresponding to the party-key which was depressed. A trough 148 is arranged in the casing so as to catch the pieces of paper cut from the ticket and prevent them falling down into the machinery and clogging or interfering with the operation of the machine.

Below the party and amendment keys is arranged a trapping device which prevents more than one key being depressed at one time. This trap comprises an oblong box 147, which extends across the casing below the keys. In the top and bottom of the box 147 are formed openings 146, which are arranged to register with each other. On the bottom of the keys are formed lugs 149, to each of which is pivotally secured a depending finger 150, which is arranged to pass through the holes in the top and bottom of the box 147 and project a short distance below the bottom of said box. These fingers, as will be explained hereinafter, are instrumental in recording the number of times each key is depressed. Each finger 150 is cut away or notched, as at 151, so as to leave a tongue 152. Plates 153 are slidably mounted in a suitable guideway 155, arranged in the box 147. Each plate is held in its normal position by means of a flat spring 154, which is mounted in the bottom of the box and extends up through an opening 156, formed in the guideway 155, and enters a notch 157, formed in the bottom of the plate 153. The plates 153 are so arranged that the adjacent edges of two plates will extend into the notch 151 in each of the fingers 150. In their normal position the plates are slightly separated and are so spaced that the sum of the spaces between all the plates is equal to the space necessary for the passage of a single finger 150, but will not be as wide as the width of two fingers. Therefore when the key is depressed the tongue on that key will pass between the two plates immediately below the key, shoving said plates apart and causing the plates at each side thereof to move back until all the plates have been moved sufficiently to form a space wide enough for the passage of the finger 150 on the key which is being depressed. Then if another key is depressed before the first-mentioned key is released the tongue 152 on the depending finger will come in contact with one of the plates 153 and prevent the key from being depressed sufficiently to actuate any mechanism. This trapping device prevents the machinery from being thrown out of order by the voter trying to make the machine perform more than one function at one time.

The devices for preventing improper manipulation of the keys are arranged as follows: The first of these devices is designed to automatically lock the machine after each ballot is cast. Beneath both master-keys 76 and 77 is arranged a horizontal rod 160, to which is secured a vertical bar 161, arranged to move freely in a guideway 162, formed in the side of the casing. A small rod 163 is hinged to the bar 161 and extends down so as to come into contact with a lug 164, formed on the drum 200. A link 166 is secured at one end by a pin 168 to the arm 167, secured to the rod 67, and its other end is connected to the rod 163 by a pin 169, which passes through a slot 170, formed in the said link 166. The location of the lug 164 is such that when the machine is in its starting position the said lug will be under the end of the rod 163 and will hold the bar 160 up against the keys 76 and 77, preventing them being depressed. When the officer in charge of the booth wishes to place the machine in condition so that it can be operated upon by a voter, he shoves in the knob 68, thereby pushing the end of the rod 163 off of the lug 164, and the bar 160 will fall of its own weight. When the voter has completed his ballot, the drum 200 will have made a complete revolution and the lug 164 will come in contact with the rod 163 and lift the bar 160 up against the under side of the keys, thus automatically locking the keys, so that it is impossible for the voter to vote a second time.

Beneath the master-keys and party-keys is arranged a small rod 175. To this rod is secured two plates 176 and 177, which extend at right angles to each other. The plate 176 extends in under only the master-keys and the plate 177 extends under the party-keys. To the plate 177 is attached a weight 178. Two small arms 179 extend out from the plate 176 at a right angle to the plate 177. Rods 180 and 181 are secured to the master-keys and are arranged to come in contact with the arms 179 when the said keys are depressed, thereby tilting the plate 177, and the weight thereon causes it to fall, swinging up the plate 176, which will come up against the key which was depressed, and as the key moves up the plate 176 will assume a vertical position under both the master-keys, thereby preventing the same master-key from being pressed down a second time or the other master-key from being pressed down at all and at the same time unlocking the party-keys. A rod 182 is mounted in proximity to the rod 175 and is operatively connected thereto by a crank 183. A flexible finger 184 is mounted at the end of the rod 182. When the drum 31 has completed a full revolution—that is, after a complete ticket has been voted, a lug 185, which is formed on the drum 31, comes in contact with the end of the finger 184, which in turn causes a rotation of the rod 175, tilting down the plate 176 under the master-keys and raising the plate 177 under the party-keys, leaving the machine in condition for the next voter.

The locking device under the amendment-keys is arranged as follows: A plate 188 is supported about centrally on a rod 189, which is mounted in bearings, so that it can turn freely. To one side of the plate 188 is secured a weight 190, so that the plate will normally stand vertically, thereby locking the amendment-keys. A spring catch or latch 191 is arranged so that when the plate 188 is brought into a horizontal position the side of the plate 188 which is not weighted will be caught by the said latch 191 and the plate will be held in a horizontal position. Depending fingers 192 and 193 are secured to the respective amendment-keys. To the rod 189 is secured a flat spring 194, and on the sprocket-chain which connects the drum 31 with the cyclometer-drum 200 (hereinafter mentioned) is arranged a small lug 195. When either of the amendment-keys are depressed, the finger which depends therefrom will press down on the weighted side of the plate 188, and when the key comes up again the plate will assume a vertical position under both keys, thereby preventing the key which was pressed down from being pressed down a second time and also preventing the other amendment-keys from being pressed down at all. As the drum 31 revolves the lug on the sprocket-chain will come into contact with the spring 194 and will tip down the plate 188, so that it will again be engaged by the catch 191, so that either of the keys can be depressed by the next voter.

The mechanism for recording the whole number of ballots cast is arranged as follows: In the rear wall of the casing 1 is formed a small opening 196, behind which is mounted a register 197 of the usual construction, so that the face thereof is visible through the said opening. The shaft 198 of the units-wheel of the register 197 is extended out so that the outer end thereof is in proximity to the head 32 of the drum 31, and on the end thereof is mounted a star-wheel 199. On the head 32 is formed a lug 38, so that at each complete revolution of the drum the said lug will come into contact with the star-wheel 199, causing a rotation of the shaft 198, and thereby actuating the register 197 one unit. By means of this register it is possible to ascertain the number of ballots which has been cast at any time by glancing through the opening 196.

The mechanism for recording the number of votes cast either in favor of or against an amendment proposition is arranged as follows: On the outer wall of the partition 222 are mounted two small registers 300 and 301. Crank-arms 302 and 303 are secured to the respective units-wheels of the registers. Rods 304 and 305, respectively, are pivotally secured to the respective crank-arms 302 and 303 and at their opposite ends are secured by means of links 306 and 307 to the respective fingers 150, which depend from the respective amendment-keys.

Below the drum 31 is mounted a drum 200. This drum is provided with trunnions 201 and 202, to which are secured cones 203 and 204, respectively, which fit into cups 205 and 206, arranged in the sides of the casing. The cups 205 and 206 are provided with ball-bearings 207. On one end of the drum 200 is secured a collar 208, by means of pins 209. On the opposite end of the drum 200 is secured an annular plate 210 by means of screws 211. Between the plate 210 and the collar 208 are arranged rows of registers 213. The rows extend longitudinally of the drum, and there are as many registers in a row as there are party-keys in the machine, and there are as many rows around the drum as there are candidates on the ticket. The registers are held in position by being clamped between the said plate 210 and the said collar 208, and therefore they can be easily removed when it is desired to reset them. Each register is provided with a number, and each candidate on the ticket is given a number which corresponds with the number of the register which is to register the votes for the candidate. The figures on the registers are preferably arranged to form printing-type. To each party-key is secured a depending finger 150, (hereinbefore mentioned,) and each finger 150 is so arranged that each time a party-key is depressed the end of the finger secured to that key enters an opening 214 in the face of the register, which is numbered corresponding to the candidate whose name was punched when the key was depressed, and actuates the register mechanism so as to record one vote for that candidate.

On the collar 208 is mounted a ring 216 so as to freely turn on the said collar 208. On this ring are formed teeth 217. A sprocket-chain 215 forms an operative connection between the ring 216 and the drum 31. On the collar 208 is formed a V-shaped projection or lug 218. On the ring 216 is mounted a pawl 219, arranged to engage the V-shaped lug 218. A spring 220 is arranged to hold the pawl 219 in contact with the lug 220. On the end of the drum 200 and preferably formed integral therewith is secured a pulley 221. Within the casing 1 is formed a small compartment 222, which is provided with a door 223. In this compartment is mounted a drum 224, on one end of which is secured a crank-pin 225, by means of which the drum can be rotated. A belt 226 passes through openings 227 in the wall of the compartment 222 and operatively connects the drum 224 with the pulley 221 on the cyclometer-drum 200.

In the back of the casing below the compartment 222 is arranged a door 228. In the bottom of the casing 1 on a shaft 229 are fulcrumed two levers 230 and 231. On the respective levers 230 and 231 are arranged standards 232 and 233, in each of which is formed a crotch 234 and 235, respectively. In the respective crotches are mounted springs 236 and 237, respectively. A roller 238 is supported on the standards 232 and 233 by means of trunnions 239 and 240, which rest on the respective springs 236 and 237. The roller 238 is preferably provided with a coating or covering of rubber or similar material. Near the rear of the casing are mounted standards 241 and 242, respectively, in which are journaled small rollers 243, 244, 245, 246, and 247, respectively. An endless strip or band 248 of paper or other material suitable for taking an impression is arranged on the rollers 238, 243, 244, 245, 246, and 247. At the bottom of the door 228 are arranged two arms 248 and 249, respectively. The arm 248 is connected with the lever 231 by means of a link 250, and the arm 249 is connected with a lever 230 by means of a link 251.

A ledge or bracket 123 is arranged across the front of the casing on which is mounted a knife-blade 255, which is secured thereto by means of links 256 and 257 and is held against upward displacement by straps 258 and 259. At one end of the knife-blade is formed a socket 260. A link 270 is provided at one end with a ball arranged to fit into the socket 260 in the end of the knife-blade and is pivotally secured at its other end to the upper end of a rod 272, the lower end of which is pivotally secured by means of pin 273 to an arm 274, secured to the lever 231.

On the standards 232 and 233 are mounted flexible arms 264 and 265, which support an inking-roll 266 in proximity to the drum 200.

The operation of the mechanism last described is as follows: Whenever the drum 31 is actuated by the operation of a key, the ring 216 on the cyclometer-drum will be similarly moved in the direction indicated by the arrow and the pawl thereon will remain in engagement with the lug on the end of the drum and the register-drum will be carried around with the ring. Now when it is desired to take a record of the vote cast the door 228 is let down, which lifts the ends of the levers 230 and 231, thereby bringing the inking-roller 266 and the roller 238 into contact with the surface of the register-drum 200, and at the same time the upward movement of the lever will cause a vertical movement of the rod 272, which causes a horizontal movement of the knife-blade 285, which severs the portion of the ticket which has been voted from the portion of the ticket which has not been voted, thereby preventing any additions to the ticket after the polls are closed. The door 223 is then opened, and the operator rotates the drum 224 by means of a handle 225, and the motion thereof is communicated to the register-drum 200, which rotates in the direction in which the drum 224 is rotated, and therefore the pawl on the ring 216 will be disengaged from the lug 218, so that the said ring 216 will remain stationary while the drum is rotated and a complete impression will be made on the record-sheet 248. It will be readily seen that it is necessary that the drum carrying the cyclometers rotate independently of the ring 216, for if it carried the ring around with it it would cause a movement of the drum 226, thereby disarranging the greater part of the mechanism.

A bell 280 is supported in proximity to the drum 31. A hammer 281 is supported in guides 282. A coil-spring 283 is arranged between the guide 282 and the head of the hammer. A small arm 284 is pivotally secured on the ledge beneath the drum 31, and the hammer 281 is operatively connected therewith by a link 285. A small lug 287 is formed on the head of the drum 31 and arranged so as to come into contact with the said arm 284 at each complete revolution of the said drum, thereby causing the hammer to come into contact with the bell, which will indicate to the voter that he has finished his ballot.

What I claim is—

1. A voting-machine comprising a casing, means for supporting a ticket-roll in said casing, means for drawing said ticket from said ticket-roll, a marking device arranged in said casing, keys mounted in said casing, means operatively connecting said keys with the means for drawing said ticket from said ticket-roll, means operatively connecting said keys with said marking devices, a drum arranged in the lower part of said casing, registers mounted on the periphery of said drum, means for rotating said drum and fingers depending from said keys and arranged to actuate the said registers.

2. In a voting-machine comprising a casing, a ticket-carrying spool supported in said casing, a drum, means for actuating said drum, a spindle to which the ticket is secured after being carried around said drum, means for locking said drum against rotation, keys arranged to control said locking means, marking devices mounted in said casing and operatively connected with said keys, a drum mounted in the lower portion of said casing, registers mounted on said drum, means for operatively connecting the register-carrying drum with the first-mentioned drum, and fingers secured to said keys and arranged to operate the registers.

3. In a voting-machine, a casing, a ticket-carrying spool supported in said casing, a drum, means for actuating said drum, a spindle to which the ticket is secured after being carried around said drum, means for locking said drum, against rotation, keys arranged to control said locking means, marking devices operatively connected to said keys, a drum mounted in the lower part of said casing, registers arranged in said drum, means for operatively connecting said cyclometer-carrying drum with the first-mentioned drum, a record-sheet operatively supported below the register-carrying drum and means for bringing said record-sheet in contact with the faces of the registers so as to obtain an impression of the registers figures' thereon.

4. In a voting-machine, a casing, a ticket-carrying spool supported in said casing, a drum, means for actuating said drum, a spindle to which the ticket is secured after being carried around said drum, means for locking said drum against rotation, keys arranged to control said locking means, marking devices operatively connected to said keys, a drum mounted in the lower portion of said casing, registers arranged on said drum, means for operatively connecting said register-carrying drum with the first-mentioned drum, a record-sheet operatively supported below the register-carrying drum, and means for bringing said record-sheet in contact with the faces of the registers so as to obtain an impression of the figures of the registers.

5. A voting-machine comprising a casing, a ticket-carrying spool supported in said casing, a drum, means for actuating said drum, a spindle to which the ticket is secured after being carried around said drum, means for locking said drum against rotation, keys arranged to control said locking means, punches operatively connected with said keys, a drum mounted in the lower part of said casing, registers arranged on said drum, means for operatively connecting said register-carrying drum with the first-mentioned drum, and means connected to the said keys for operating said registers.

6. In a voting-machine, a casing, a shaft mounted in said casing, a drum journaled on said shaft and having lugs formed on one end, a wheel mounted on said shaft and provided with teeth arranged to engage with lugs on said drum, a spring connecting said wheel and said shaft, teeth arranged on the periphery of said wheel, a rack mounted in a slideway arranged below said wheel and having its teeth arranged to engage with the teeth on said wheel, means for moving said rack back and forth and means for preventing the movement of said rack either way until it has completed its full travel in the opposite direction.

7. A voting-machine comprising, a casing, a roll-holder, a bobbin for holding the ticket after it has been voted, a drum around which the ticket is carried, means for actuating said drum, means for actuating the bobbin, so as to wind in the ticket as it is fed by the drum, an opening formed in said casing, punches arranged behind said opening in view of the voter, a series of keys arranged below said drum and operatively connected with the said drum, which said series of keys comprise two master-keys and a number of party and amendment keys, arranged and operatively connected so that one of the master-keys must be depressed before any of the party-keys can be depressed, a register-carrying drum mounted in said casing, fingers secured to each of said party-keys, and arranged to come in contact with and actuate the said registers, a record-sheet operatively supported below said register-carrying drum, means for bringing said record-sheet in contact with the outer surfaces of the registers, and means for rotating said drum, so as to record the figures on all the registers on the said record-sheet, substantially as described and for the purpose set forth.

8. A voting-machine comprising a casing having a hinged portion, a ticket-roll holder mounted near the top of said casing, a bobbin for receiving the ticket after it has been voted, a drum arranged below said ticket-holder, means for actuating said drum, a series of keys arranged below said drum, means for locking said drum against rotation and means for operatively connecting the said keys with the said locking mechanism so that depressing the said keys will permit a movement of the said drum, punches supported in said casing and operatively connected with said keys, and a shear-blade mounted in proximity to the roll-holder and arranged so that the opening of the hinged portion of said casing will cause the said shear-blade to sever the portion of the ticket which has been voted from the remainder of the roll.

9. A voting-machine comprising a casing, a roll-holder mounted in said casing, a bobbin for receiving the ticket after it has been voted, a drum around which the ticket is carried before being wound on the bobbin, means for actuating said drum, a series of keys arranged below said drum, teeth formed on the periphery of said drum, said teeth being equal in number to the number of names which can possibly be required on any ticket, plates slidably secured on said drum and arranged to span the spaces between the teeth on said drum, so as to reduce the number of teeth as may be required to correspond with the number of names on a ticket, pawls arranged to engage with the said teeth and means whereby the depressing of the keys will free the pawls from engagement with the said drum, substantially as described.

10. A voting-machine, comprising a casing, a roll-holder mounted in the top of said casing, a bobbin mounted by the side of said roll-holder, a drum arranged below said roll-holder around which the ticket is carried before being wound on the bobbin, a series of teeth formed on the periphery of said drum, plates slidably mounted in said drum and arranged to span the spaces between the teeth so as to reduce the teeth to any number desired, pawls mounted in proximity to said drum and arranged to engage with the said teeth, keys operatively connected to said pawls, punches operatively connected to said keys and arranged to punch the ticket in the column corresponding to the key which is depressed, a register-carrying drum mounted below said first-mentioned drum, a sprocket-chain operatively connecting said drums, a finger depending from each party-key and arranged to come in contact with and operate a register every time a key is depressed, a record-sheet operatively supported below said register-drum and means for obtaining an impression from the registers on said record-sheet, substantially as described and for the purpose set forth.

11. A voting-machine comprising a casing, an opening formed in the front of said casing, a ticket-roll holder mounted in the upper part of said casing, a drum arranged below said roll-holder, a bobbin for winding in the ticket after it has been voted, a spring for driving the said drum, means for winding said spring, a series of keys arranged below said drum, means for locking said keys, means operatively connected with one set of keys for automatically locking and unlocking the other set of keys, punches mounted in said casing behind said opening and operatively connected with said keys, a register-carrying drum mounted in said casing, fingers depending from said keys and arranged to operate the register mechanism, a record-sheet supported in the bottom of said casing, means for bringing said record-sheet in contact with the figures on the registers so as to obtain a record thereof, a shear-blade mounted in proximity to the ticket and operatively connected to a door in said casing so that opening the said casing will cause the said shear-blade to sever the portion of the ticket which has been voted, from the portion of the ticket which has not been voted, substantially as described.

12. A voting-machine comprising a casing, an opening formed in the front of said casing, a ticket-roll holder mounted in the upper part of said casing, a drum arranged below said roll-holder, a bobbin for winding in the ticket, means for actuating said drum, means for actuating said bobbin, a series of keys arranged below said drum two of said keys constituting the master-keys one of which must be depressed before any other key can be depressed, means for locking all the keys, means for locking the master-keys, means for locking the party-keys, means whereby depressing either of the master-keys will unlock the party-keys and lock the master-keys after they have returned to their upper position after being depressed and means for automatically locking the master-keys when a complete ticket has been voted.

13. In a voting-machine a casing, a ticket supported in said casing, a marking device arranged in said casing comprising two swinging members arranged to form a punch, means for carrying the ticket between the members of the marking device, a key mounted in said casing and means for operatively connecting both members of said marking device with said key so that by depressing said key, the said members will be caused to close upon the ticket.

14. A voting-machine comprising a casing, means for supporting a ticket within said casing, punches mounted in said casing, means for carrying the ticket between the members of said punches, keys mounted in said casing, means for operatively connecting said keys and said punches and means for registering the number of times each key is depressed.

Signed by us at Orange City, Iowa, this 6th day of July, 1903.

ARIE J. VAN DEN HEUVEL
JAMES J. GALMAN.

Witnesses:
P. D. VAN OOSTENHOUT,
C. HOSPERS.